(12) United States Patent
Shin

(10) Patent No.: US 9,291,298 B2
(45) Date of Patent: Mar. 22, 2016

(54) STAND FOR DISPLAY DEVICE AND DISPLAY DEVICE INCLUDING THE SAME

(71) Applicant: LG ELECTRONICS INC., Seoul (KR)

(72) Inventor: Donghyok Shin, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 646 days.

(21) Appl. No.: 13/651,068

(22) Filed: Oct. 12, 2012

(65) Prior Publication Data
US 2013/0094147 A1 Apr. 18, 2013

(30) Foreign Application Priority Data
Oct. 14, 2011 (KR) .................. 10-2011-0105263

(51) Int. Cl.
*H05K 7/20* (2006.01)
*F16M 11/08* (2006.01)
*G06F 1/16* (2006.01)
*G06F 1/20* (2006.01)
*F16M 11/24* (2006.01)
*H04N 5/64* (2006.01)

(52) U.S. Cl.
CPC .............. *F16M 11/08* (2013.01); *F16M 11/24* (2013.01); *G06F 1/1601* (2013.01); *G06F 1/20* (2013.01); *F16M 2200/027* (2013.01); *F16M 2200/048* (2013.01); *F16M 2200/08* (2013.01); *H04N 5/64* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,899,552 A | * | 5/1999 | Yokoyama et al. | 362/619 |
| 6,392,873 B1 | * | 5/2002 | Honda | 361/679.22 |
| 7,433,185 B1 | * | 10/2008 | Curran et al. | 361/679.41 |
| 7,551,432 B1 | * | 6/2009 | Bockheim et al. | 361/679.07 |
| 8,248,780 B2 | * | 8/2012 | Zheng et al. | 361/679.47 |
| 8,576,554 B2 | * | 11/2013 | Quijano | 361/679.23 |
| 2004/0130859 A1 | * | 7/2004 | Helot et al. | 361/681 |
| 2007/0097609 A1 | * | 5/2007 | Moscovitch | 361/681 |
| 2008/0232044 A1 | * | 9/2008 | Moscovitch | 361/681 |
| 2012/0268892 A1 | * | 10/2012 | Quijano | 361/679.58 |
| 2015/0042994 A1 | * | 2/2015 | Yung-Yao et al. | 356/399 |

* cited by examiner

*Primary Examiner* — Gregory Thompson
(74) *Attorney, Agent, or Firm* — Birch, Stewart, Kolasch & Birch, LLP

(57) ABSTRACT

A display device is disclosed. The disclosed display device has an excellent appearance through prevention of outward exposure of wirings. The display device is also configured to easily outwardly dissipate heat generated from various electronic elements included in the display device.

20 Claims, 17 Drawing Sheets

STAND FOR DISPLAY DEVICE AND DISPLAY DEVICE INCLUDING THE SAME

This application claims the benefit of the Korean Patent Application No. 10-2011-0105263, filed on Oct. 14, 2011, which is hereby incorporated by reference as if fully set forth herein.

BACKGROUND OF THE INVENTION

1. Field of the Invention

The present invention relates to a display device, and more particularly, to a display device having an excellent appearance through prevention of outward exposure of wirings while easily dissipating heat generated from various electronic elements included in the display device.

2. Discussion of the Related Art

Display devices are used to display an image signal input from outside. Such display devices include a monitor for displaying an image received from a computer, a television for displaying an image transmitted, along with an audio signal, from a broadcasting station, and devices of any types capable of displaying an image input from outside.

Early-developed conventional display devices mainly employ a Braun tube system, namely, a cathode-ray tube (CRT) system. Typically, such a CRT type display device is installed on an installation surface such as a desk because it has a box shape occupying a considerable volume.

In accordance with development of technologies, however, display devices have recently been advanced from the above-mentioned CRT type to a flat type such as a liquid crystal display (LCD) or a plasma display panel (PDP). That is, the latter display devices have a remarkably-reduced thickness and thus have a considerably-reduced weight.

Such a flat display device may be installed using a wall mounting structure or a stand structure. When a flat display device is installed using a wall mounting structure, a wall mounting bracket is fixed to a wall, and the flat display device is mounted to the wall mounting bracket.

On the other hand, when a flat display device is installed using a stand structure, it may be supported by a stand having a neck and a base.

The neck is mounted to a display body to display an image at a lower end of the display body or a back surface of the display body, to perform a function of supporting and distributing the weight of the display body. The base is mounted to the neck, to distribute the weight of the display body to an installation surface. In accordance with such a structure, it is possible to install a thin display device on an installation surface in an upright state.

The above-mentioned flat display device has an advantage in that it is easily rotatable by virtue of small volume and light weight thereof. Among recently-developed flat display devices, which have the above-mentioned advantage, there is a display device having a swivel function to enable the user to view the display device at an optimal viewing angle from any position.

Meanwhile, the above-mentioned stand should be designed not only to support the weight of the display body, but also to support a swivel load caused by swivel of the display body.

In particular, large-size display devices such as TVs have a trend of increasing size and, as such, such a display device also has a greatly increased weight. As a result, the stand, which is adapted to provide a swivel function to such a large-size display device, has a more complicated configuration and an increased volume.

FIG. 1 is a rear view schematically illustrating a conventional stand type display device 1. FIG. 2 is a perspective view schematically illustrating a stand included in the stand type display apparatus.

As shown in FIGS. 1 and 2, the conventional stand type display device, which is designated by reference numeral "1", includes a display body 10 including a display module, on which an image is displayed, and a stand 20 for supporting the display body 10. In the conventional case, the stand 20 only has a function to support the display body 10 such that the display body 10 is swivelable and vertically movable with respect to the stand 20. The stand 20 also has a solid body. For this reason, electric wires W connected to the display body 10 extend downwardly in an outwardly exposed state, thereby degrading the appearance of the display device and the appearance of the space where the display device is installed. Furthermore, although a separate wire arrangement means (for example, a wire tie or the like) may be used to arrange the wires, there is still a problem of a degradation in the appearance of the display device and the appearance of the space where the display device is installed because the wires arranged by the wire arrangement means are fastened to the stand in an outwardly exposed state.

Also, although not shown, a power supply unit is provided at the display body in the conventional case. This power supply unit functions as a main heat source in the display device. Meanwhile, recently-developed display modules, which employ an emissive material, for high resolution, exhibit poor heat resistance. When the conventional device employs such a display module, there is also a problem of a reduction in lifespan due to heat generated from the power supply unit.

SUMMARY OF THE INVENTION

Accordingly, the present invention is directed to a stand for a display device and a display device including the same that substantially obviate one or more problems due to limitations and disadvantages of the related art.

An object of the present invention is to provide a display device including a stand capable of receiving electric wires connected to a display body of the display device, thereby providing an excellent appearance.

Another object of the present invention is to provide a display device capable of outwardly dissipating heat generated from an interior of the display device, thereby achieving an increase in lifespan.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a display body comprising a display module, a stand for supporting the display body, a connecting assembly for mounting the display body to the stand such that the display body is swivelable and vertically movable with respect to the stand, a base connected to a bottom portion of the stand, to support the stand against an installation surface on which the stand is installed, and a power supply unit for supplying electric power to the display module, wherein the power supply unit is disposed within the base, and is electrically connected to the display module via an electric wire extending through the stand.

The stand may be provided with a chamber for receiving at least one electric wire electrically connected to the display module.

The stand may be further provided with a plurality of heat dissipation fins formed at an inner surface of the stand, to extend inwardly of the chamber.

The stand may be further provided with guides formed at opposite lateral wall portions of the stand, to guide the connecting assembly when the display body moves vertically with respect to the stand.

Each of the guides may extend through the stand in a thickness direction of the stand.

Each of the guides may include an elongated groove formed at the stand to extend to a predetermined depth in a thickness direction of the stand, and at least one heat dissipation hole extending through the elongated groove in the thickness direction of the stand.

The stand may be further provided with a plurality of heat dissipation holes formed through a rear wall portion of the stand in a thickness direction of the stand.

The stand may include an arc portion and a flat portion.

The connecting assembly may include a winding spring unit for adjusting a vertical movement of the display body by frictional force of the stand and complementary resiliances of a plurality of winding springs.

The connecting assembly may include a bracket fixedly mounted to the display body, a front slider provided with guide protrusions fitted in guides formed at the stand, a rear sliding wheel, which moves vertically while applying frictional force to the stand, two winding springs provided in the sliding wheel while being wound in opposite winding directions, and a slider frame for connecting the rear sliding wheel and the front slider while being rotatable with respect to the bracket.

The stand may include a cylindrical portion.

The connecting assembly may include a gas spring unit for adjusting a vertical movement of the display body by a gas pressure, and the gas spring unit comprises a cylinder, in which a gas is contained, and a piston rod, which moves vertically in a telescopic manner in the cylinder.

The connecting assembly may further include a bracket fixedly mounted to the display body, a load transmitter connected to an upper end of the piston rod such that the load transmitter is vertically movable together with the bracket, and at least one support plate provided at a lateral surface of the load transmitter, to be interposed between fixing portions of the bracket.

The display device may further include a support die coupled to a lower surface of the base. The support die may include a heat transfer boss for transferring, to a surface of the support die, heat generated from a heat source, which comprises the power supply unit disposed within the base.

In another aspect of the present invention, a stand for a display device, which supports a display body of the display device such that the display body is swivelable and vertically movable, includes a stand body, a chamber formed in the stand body, to receive wirings electrically connected to the display body, and at least one dissipation hole provided at the stand body.

The stand may further include a plurality of heat dissipation fins formed at an inner surface of the stand body, to extend inwardly of the chamber.

The stand may further include a plurality of heat dissipation holes formed through opposite lateral wall portions of the stand body in a thickness direction of the stand body.

The stand may further include a plurality of heat dissipation holes formed through at least one of front and rear wall portions of the stand body in the thickness direction of the stand body.

The stand body may include an arc portion and a flat portion or may have a cylindrical shape.

The display device may further include a rear cover provided at a rear surface of the display body, to cover the connecting assembly.

In accordance with the aspects of the present invention, it is possible to accommodate wirings connected to the display body within the stand, thereby providing an excellent appearance to the display device.

Also, in accordance with the aspects of the present invention, heat from the interior of the display device is outwardly dissipated, thereby preventing various electronic elements installed in the display device from being damaged due to heat. Accordingly, the lifespan of the display device can be increased.

In accordance with the aspects of the present invention, the thickness of the display body can be reduced.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Figure 1:
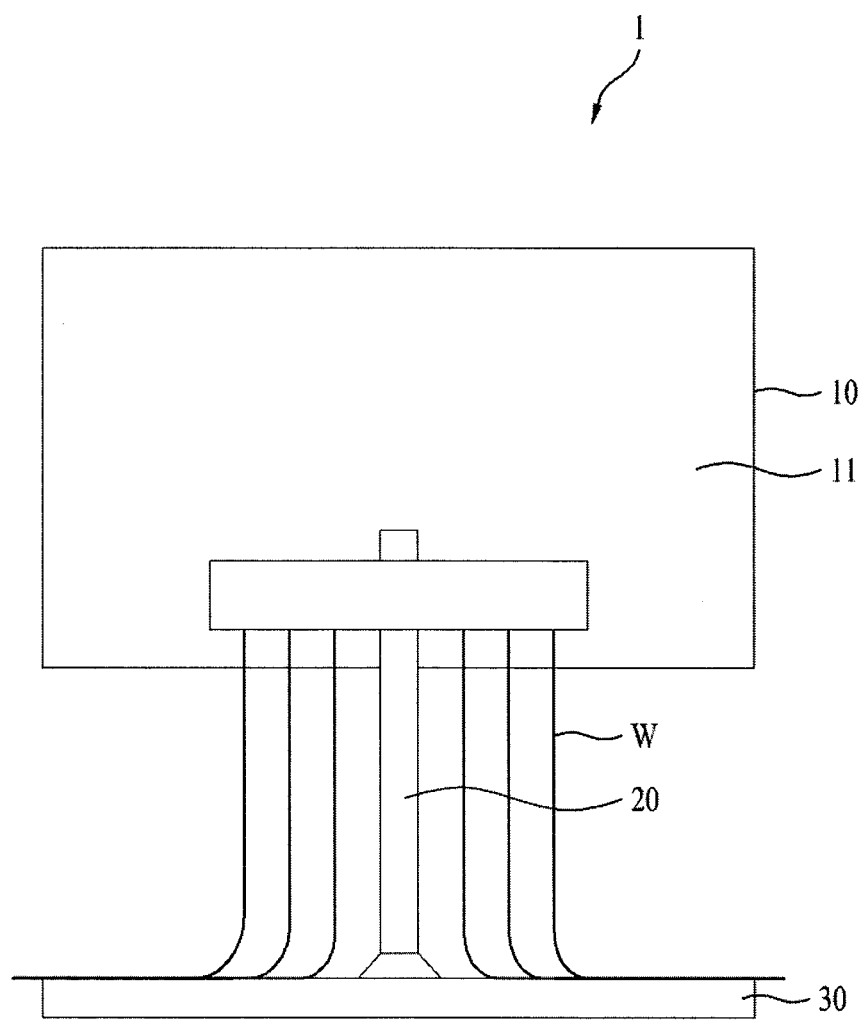
FIG. 1 is a rear view schematically illustrating a conventional stand type display device 1.
Figure 2:
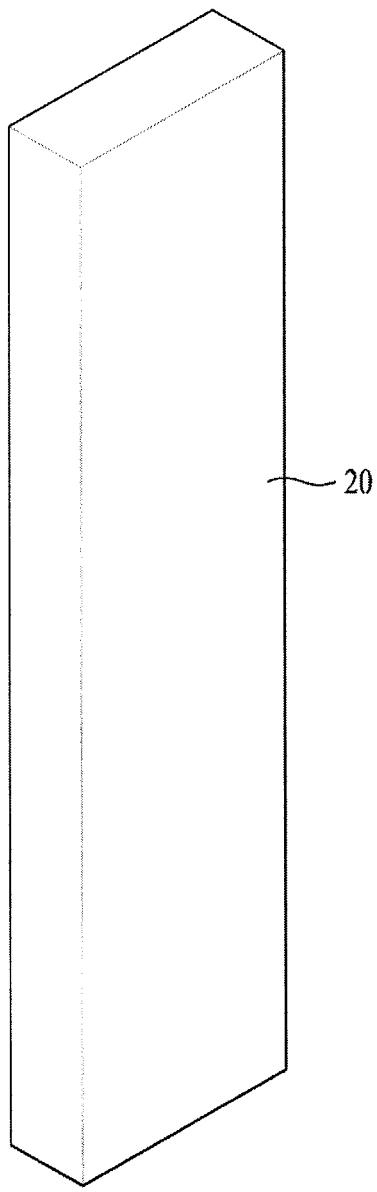
FIG. 2 is a perspective view schematically illustrating a stand included in the stand type display apparatus.

Reference will now be made in detail to the preferred embodiments of the present invention associated with a stand and a display device including the same, examples of which are illustrated in the accompanying drawings. The accompanying drawings illustrate exemplary embodiments of the present invention and provide a more detailed description of the present invention. However, the scope of the present invention should not be limited thereto.

In addition, wherever possible, the same reference numbers will be used throughout the drawings to refer to the same or like parts, and a repeated description thereof will be omitted. For clarity, dimensions and shapes of respective constituent members illustrated in the drawings may be exaggerated or reduced.

Meanwhile, terms including ordinal numbers such as "first" and "second" may be used to explain various constituent elements. However, they are only used to distinguish one element from another without limiting the element.

It will be understood that when an element is referred to as being "connected to", "mounted to" or "installed on" another element, it can be directly connected or mounted to the other element or an intervening element may be present therebetween.

Figure 3:
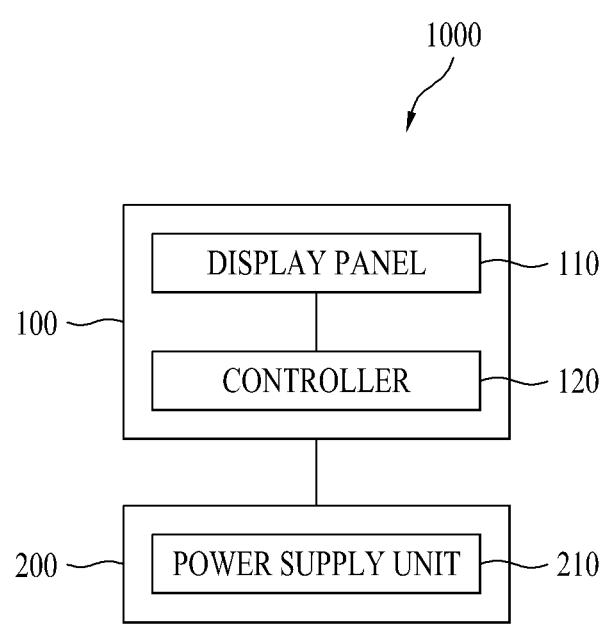
FIG. 3 is a block diagram schematically illustrating a display device according to an embodiment of the present invention.
Figure 4:
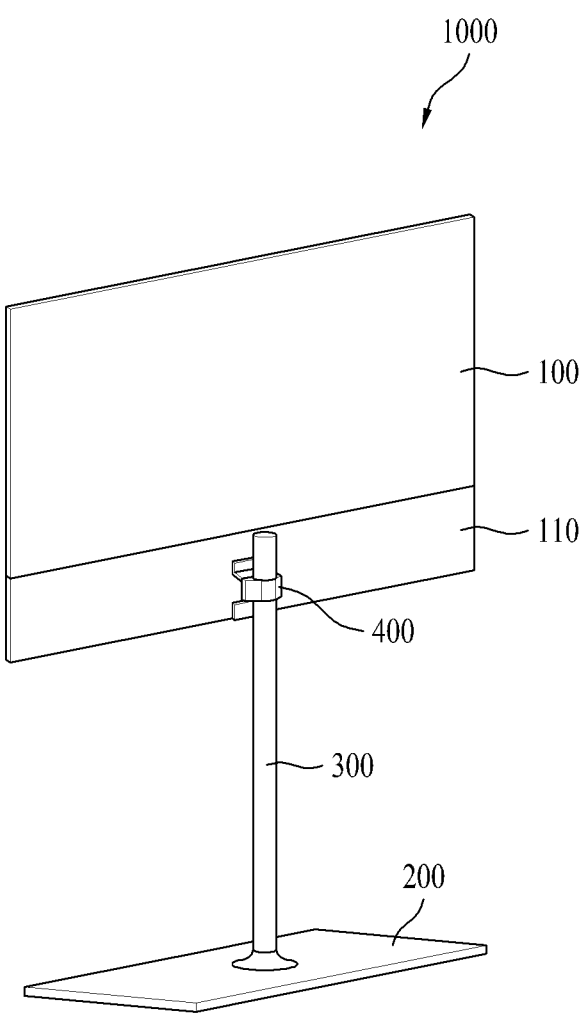
FIG. 4 is a rear perspective view schematically illustrating the display device according to the embodiment of the present invention.
Figure 5:
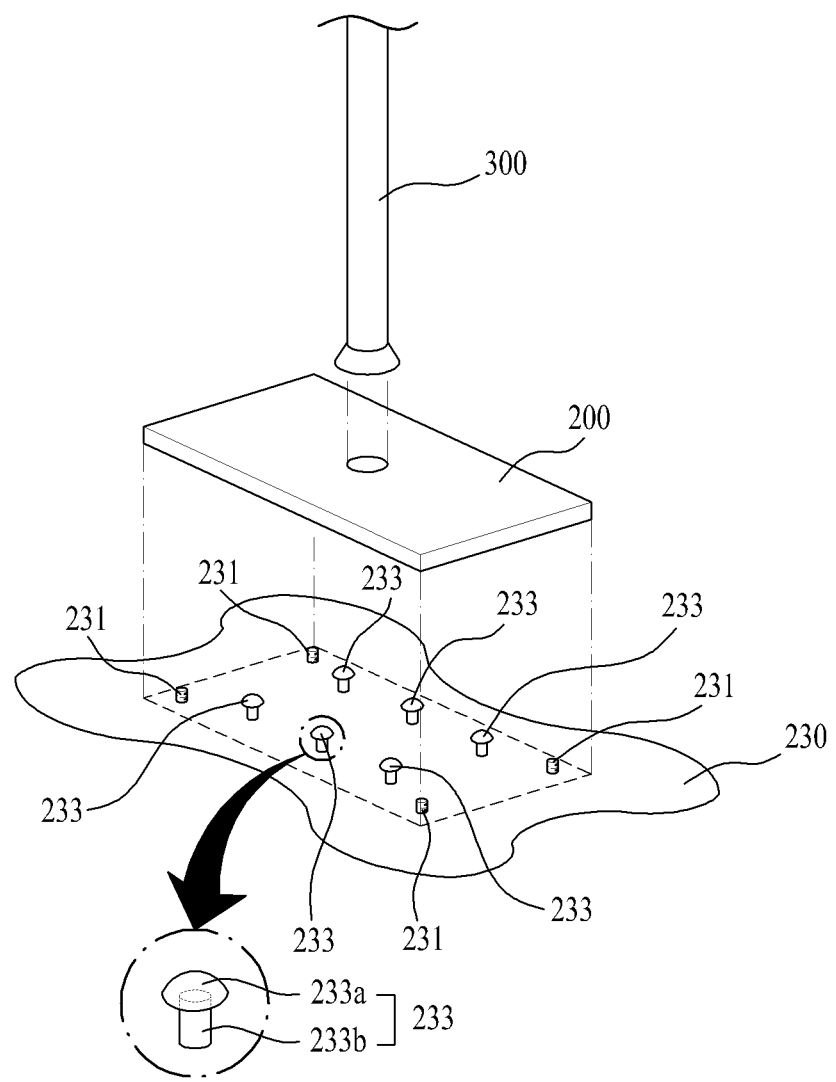
FIG. 5 is an exploded perspective view schematically illustrating a support die included in the display device in accordance with an embodiment of the present invention.

FIG. 3 is a block diagram schematically illustrating a display device 1000 according to an embodiment of the present invention. FIG. 4 is a rear perspective view schematically illustrating the display device 1000 according to the embodiment of the present invention. FIG. 5 is an exploded perspective view schematically illustrating a support die included in the display device in accordance with an embodiment of the present invention.

As shown in FIGS. 3 to 5, the display device 1000 according to the illustrated embodiment of the present invention includes a display body 100, a stand 300 for supporting the display body 100, a connecting assembly 400 (500) for mounting the display body 100 to the stand 300 such that the display body 100 is swivelable and vertically movable with respect to the stand 300, a base 200 connected to a bottom portion of the stand 300, and a support die 230 coupled to a lower surface of the base 200.

The display body 100 includes a display module 110 for outputting an image and a sound, a controller 120 for controlling the display module 110, and a frame for accommodating the display module 110 and controller 120 therein.

The display module 110 includes an audio unit and a display unit. The display unit may include any of emissive or non-emissive modules such as cathode ray tube (CRT), electroluminescent (EL) display, light emitting diode (LED), vacuum fluorescent display (VFD), field emission display (FED), plasma display panel (PDP), and liquid crystal display (LCD) modules. The display device 1000 according to the present invention may be realized using various kinds of image display devices such as TVs and monitors.

Preferably, the display unit may include an organic light emitting diode (OLED) panel or a quantum dot panel.

Although not shown, a rear cover may be provided at a rear side of the display body 100, to cover the connecting assembly 400 (500) in order to prevent the connecting assembly 400 (500) from being outwardly exposed. The rear cover is provided at the frame, to prevent the connecting assembly 400 (500) from being exposed to the outside of the display device 1000, and thus to provide an excellent appearance to the display device 1000. The rear cover may be configured such that it is fixed to the frame at opposite ends thereof or such that it is hingably mounted to the frame at one end thereof while being detachably mounted to the frame at the other end thereof.

As shown in FIG. 3, the display module 110 of the display body 100 according to the present invention may dispense with a power supply unit 210. In place, the power supply unit 210 may be provided at the base 200. That is, the display body 100 may include the display module 110 and controller 120, whereas the base 200 may include the power supply unit 210. The display module 110, controller 120 and power supply unit 210 may be electrically connected by wires. The power supply unit 210 may include, for example, an AC-DC converter for converting AC power supplied from a power supply source (for example, Korea Electric Power Corporation (KEPCO)) into DC power and/or a DC-DC converter for converting the converted DC power into DC power required by the display module 110.

As the power supply unit 210 is spatially separated from the display body 100 in accordance with mounting thereof in the base 200, it is possible to remarkably prevent various electronic elements (in particular, the display unit) from being damaged due to heat generated from the power supply unit 210. Accordingly, it is possible not only to increase the lifespan of the display device 1000, but also to reduce the space occupied by the power supply unit 210 within the display body 100 and thus to reduce the thickness and/or volume of the display body 100.

The base 200 may include the power supply unit 210 accommodated within the base 200. The base 200 is mounted to the bottom portion of the stand 300 to enable the stand 300 to be firmly supported by an installation surface.

As shown in FIG. 5, the support die 230 is coupled to the lower surface of the base 200, to close the lower surface of the base 200. The support die 230 has a larger area than that of the base 200. The support die 230 also has round portions at four corners thereof, respectively.

The support die 230 includes a plurality of coupling boss 231 for fastening the support die 230 to the lower surface of the base 200, and a plurality of heat transfer bosses 233 for transferring, to the support die 230, heat generated from heat sources such as the power supply unit and AC-DC converter mounted in the base 200

Each heat transfer boss 233 includes a support boss 233b extending vertically from an upper surface of the support die 230, and a planar member 233a integrated with the support boss 233b, to surface-contact heat sources such as the power supply unit and AC-DC converter.

The planar member 233a has a larger area than that of an upper end of the support boss 233b.

The support die 230 may be made of aluminum or aluminum alloy, which exhibits excellent thermal conductivity.

In accordance with provision of the support die 230, it is possible to secure an increased support area, and thus to achieve an enhancement in the support stability of the display device. Also, in accordance with provision of the heat transfer bosses 233 at the support die 230, it is possible to effectively dissipate heat generated from heat sources such as the power supply unit and AC-DC converter through the support die 230, and thus to achieve an enhancement in the heat dissipation ability of the display device. Accordingly, an increase in the lifespan of the display device can be achieved.

The stand 300 has a structure capable of allowing electric wires (or wirings) electrically connected to the display body 100 and/or the base 200 to extend through the stand 300. The stand 300 is mounted to the base 200 such that the bottom portion of the stand 300 communicates with the interior of the base 200. Thus, the stand 300 functions as a flow path of heat generated within the base 200 (for example, from the power supply unit 210). The stand 300 will be described in more detail later with reference to the accompanying drawings.

The connecting assembly 400 (500) has a structure capable of mounting the display body 100 to the stand 300 such that the display body 100 is swivelable and vertically movable with respect to the stand 300. That is, the connecting assembly 400 (500) connects a rear surface of the display body 100 to the stand 300 such that the display body 100 is swivelable and/or vertically movable in accordance with user convenience. Thus, the connecting assembly 400 (500) fixes the display body 100 at a swivel angle and/or a level set by the user. The connecting assembly 400 (500) will be described in detail later with reference to the accompanying drawings.

Figure 6:
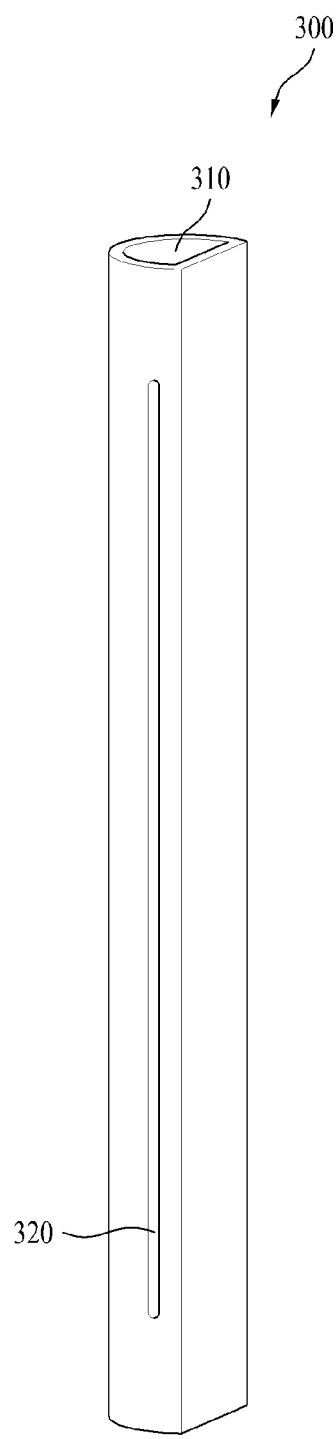
FIG. 6 is a perspective view schematically illustrating a stand according to a first embodiment of the present invention.
Figure 7:
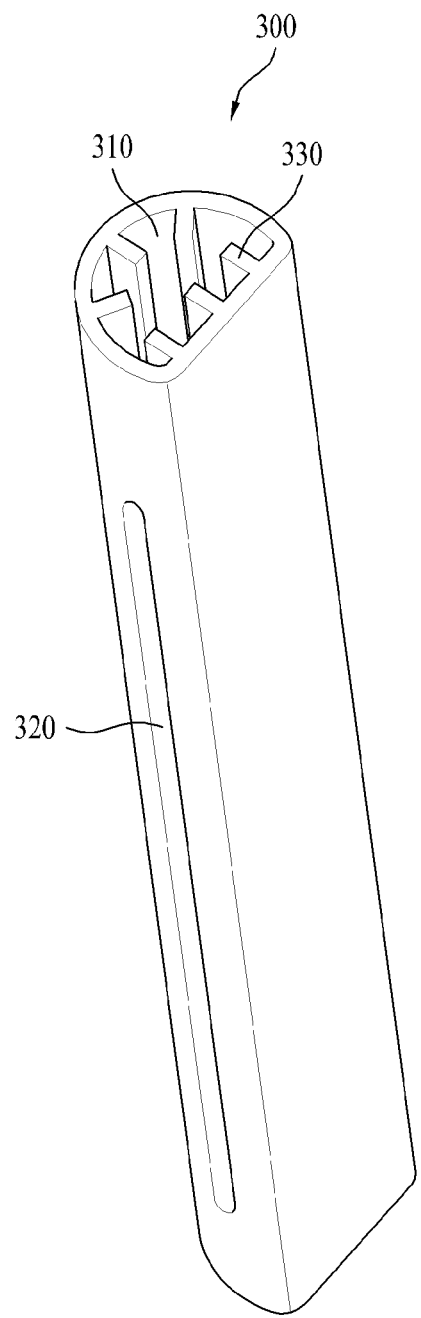
FIG. 7 is a plan view schematically illustrating the stand according to the first embodiment of the present invention.
Figure 8A:
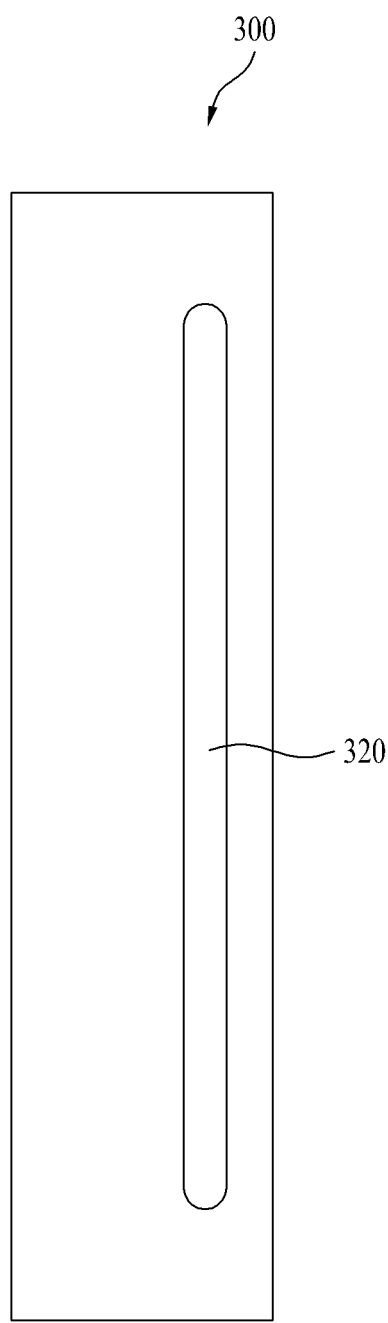
FIG. 8A is a side view schematically illustrating the stand according to the first embodiment of the present invention.
Figure 8B:
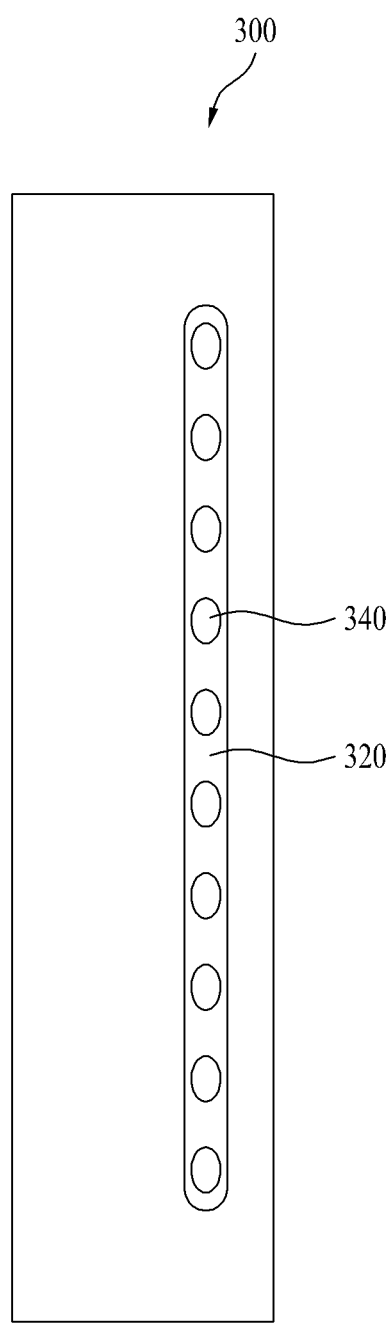
FIG. 8B is a side view schematically illustrating a stand according to an additional embodiment associated with the first embodiment of the present invention.

FIG. 6 is a perspective view schematically illustrating a stand 300 according to a first embodiment of the present invention. FIG. 7 is a plan view schematically illustrating the stand 300 according to the first embodiment of the present invention. FIG. 8A is a side view schematically illustrating the stand 300 according to the first embodiment of the present invention. FIG. 8B is a side view schematically illustrating a stand 300 according to an additional embodiment associated with the first embodiment of the present invention.

As shown in FIGS. 6 to 8B, the stand 300 according to the first embodiment of the present invention includes a stand body for connecting the display body 100 and base 200, and a chamber 310 provided within the stand body, to receive at least one electric wire (or wiring) electrically connected to the display module 110 and/or the base 200. The stand 300 also includes at least one dissipation hole 340 formed at the stand body, to communicate with the chamber 310.

The stand body is constituted by a hollow pipe member. The stand body includes an arc portion and a flat portion 350. As will be described later, the flat portion 350 functions as a frictional surface, to which a sliding wheel of a connecting assembly according to an embodiment of the present invention illustrated in FIGS. 13 to 15 applies frictional force.

Since the stand body is constituted by a hollow pipe member, a certain space, namely, the chamber 310, is formed within the stand body. The chamber 310 defines a space for receiving electric wires connected to the display module 110 and/or electric wires connected to the base 200.

The stand 300 is provided, at an inner surface thereof, with a plurality of heat dissipation fins 330 extending inwardly of the chamber 310. The heat dissipation fins 330 increase the inner surface area of the stand 300, to allow heat transferred via the stand 300 to be easily outwardly dissipated. Each dissipation fin 330 may have a plate shape. In this case, the dissipation fins 330 may function to hold the electric wires received in the chamber 310.

Guides 320 are formed at opposite lateral wall portions of the stand 300, respectively. The guides 320 define a vertical movement path of the connecting assembly. That is, the guides 320 guide the connecting assembly when the connecting assembly (and/or the display body 100) moves vertically with respect to the stand 300.

Each guide 320 may take the form of a slot extending through the stand 300 (namely, the stand body) in a thickness direction of the stand 300 or an elongated groove formed at the stand 300 to extend to a predetermined depth in the thickness direction of the stand 300.

When each guide 320 has the form of a slot extending through the stand 300 in the thickness direction of the stand 300, it may function as the heat dissipation hole 340.

On the other hand, when each guide 320 has the form of an elongated groove formed at the stand 300 to extend to a predetermined depth in the thickness direction of the stand 300, it may be provided with at least one heat dissipation hole 340 extending through the elongated groove in the thickness direction of the stand 300. When a plurality of heat dissipation holes 340 is provided at each guide 320, they may be arranged in a longitudinal direction of the guide 320.

When the power supply unit 210 is provided at the base 200, the heat dissipation holes 340 allow heat generated from the power supply unit 210 to be outwardly dissipated after flowing through the base 200 and stand 300. Accordingly, it is possible to prevent the inner temperature of the base 200 from increasing to a high temperature. It is also possible to prevent heat from the power supply unit 210 provided at the base 200 from being transferred to the display body 100.

Additionally, the plural heat dissipation holes 340 may also be provided at wall portions of the stand 300, in particular, at a rear wall portion and/or a front wall portion.

Since the stand 300 is opened at a top thereof, heat generated from the base 200 and not dissipated through the heat dissipation fins 330 is completely dissipated through the top of the stand 300.

As described above, since the stand 300 includes the chamber 310, it is possible to prevent outward exposure of the electric wires extending from the display body 100, the electric wires extending from the base 200 and/or the electric wires connecting the display body 100 and base 200. Accordingly, it is possible to provide an excellent appearance to the display device 1000 and an excellent appearance to the space where the display device 1000 is installed. Also, since the stand 300 includes the heat dissipation fins 330 and/or the heat dissipation holes 340, it is possible to easily outwardly dissipate heat generated within the base 200. Accordingly, it is possible to prevent electric elements installed in the base 200 from being damaged due to heat generated within the base 200. Thus, an increase in the lifespan of the display device 1000 is achieved.

Figure 9:
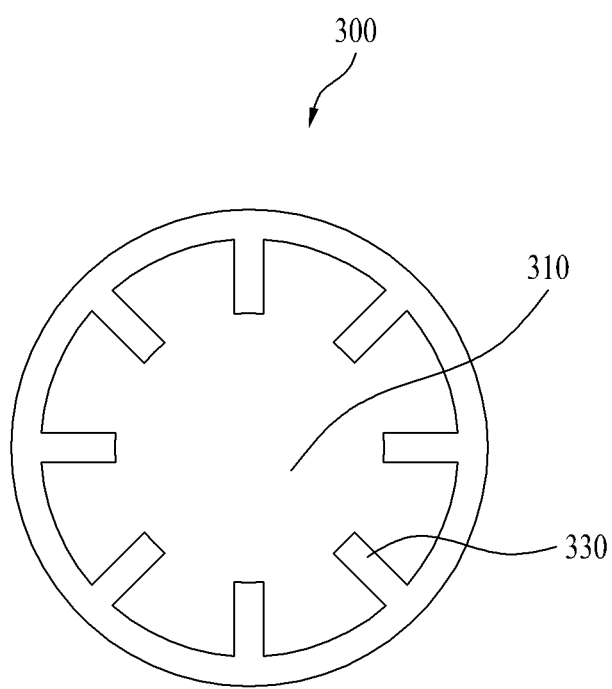
FIG. 9 is a plan view schematically illustrating a stand according to a second embodiment of the present invention.
Figure 10A:
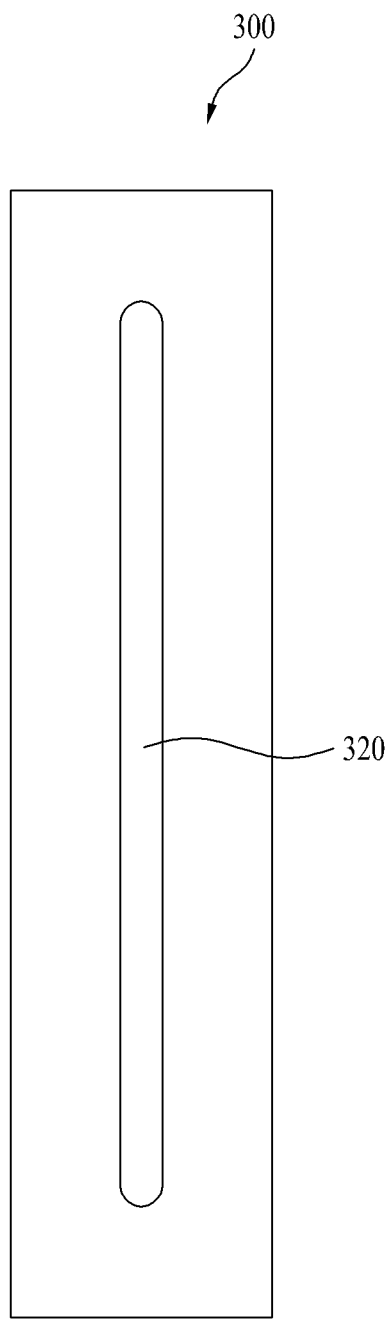
FIG. 10A is a side view schematically illustrating the stand according to the second embodiment of the present invention.
Figure 10B:
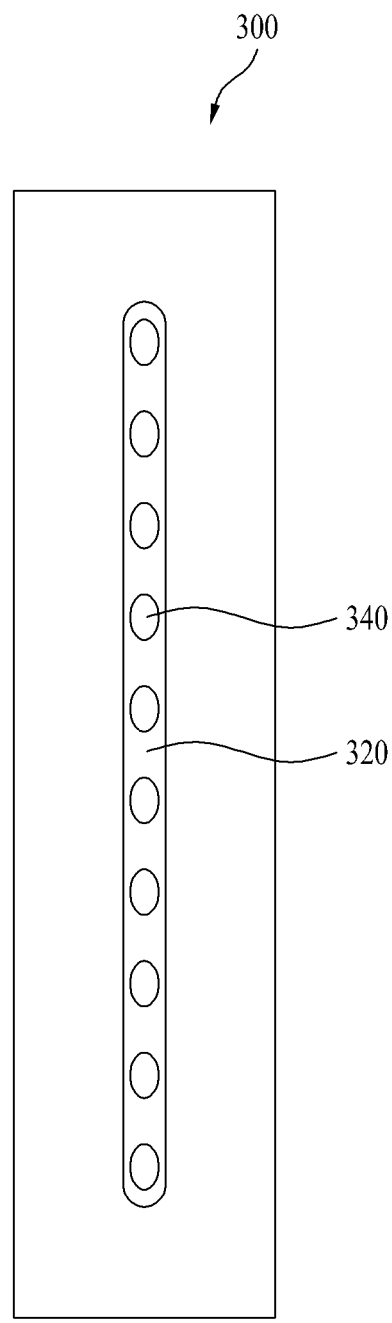
FIG. 10B is a side view schematically illustrating a stand according to an additional embodiment associated with the second embodiment of the present invention.

FIG. 9 is a plan view schematically illustrating a stand 300 according to a second embodiment of the present invention. FIG. 10A is a side view schematically illustrating the stand 300 according to the second embodiment of the present invention. FIG. 10B is a side view schematically illustrating a stand 300 according to an additional embodiment associated with the second embodiment of the present invention.

As shown in FIGS. 9 to 10B, the stand 300 according to the second embodiment of the present invention includes a stand body for connecting the display body 100 and base 200, and a chamber 310 provided within the stand body, to receive at least one electric wire (or wiring) electrically connected to the display module 110 and/or the base 200. The stand 300 also includes at least one dissipation hole 340 formed at the stand body, to communicate with the chamber 310.

The stand body is constituted by a hollow pipe member having a cylindrical shape. Since the stand body has a cylindrical shape, the interior of the stand body defines a space for receiving a gas spring of a connecting assembly according to an embodiment of the present invention illustrated in FIGS. 11 and 12, as will be described later.

Since the stand body is constituted by a hollow pipe member, a certain space, namely, the chamber 310, is formed within the stand body. The chamber 310 defines a space for receiving electric wires connected to the display module 110 and/or electric wires connected to the base 200.

The stand 300 is provided, at an inner surface thereof, with a plurality of heat dissipation fins 330 extending inwardly of the chamber 310. The heat dissipation fins 330 increase the inner surface area of the stand 300, to allow heat transferred via the stand 300 to be easily outwardly dissipated. Each dissipation fin 330 may have a plate shape. In this case, the dissipation fins 330 may function to hold the electric wires received in the chamber 310.

Guides 320 are formed at opposite lateral wall portions of the stand 300, respectively. The guides 320 define a vertical movement path of the connecting assembly. That is, the guides 320 guide the connecting assembly when the connecting assembly (and/or the display body 100) moves vertically with respect to the stand 300.

Each guide 320 may take the form of a slot extending through the stand 300 (namely, the stand body) in a thickness direction of the stand 300 or an elongated groove formed at the stand 300 to extend to a predetermined depth in the thickness direction of the stand 300.

When each guide 320 has the form of a slot extending through the stand 300 in the thickness direction of the stand 300, it may function as the heat dissipation hole 340.

On the other hand, when each guide 320 has the form of an elongated groove formed at the stand 300 to extend to a predetermined depth in the thickness direction of the stand 300, it may be provided with at least one heat dissipation hole 340 extending through the elongated groove in the thickness direction of the stand 300. When a plurality of heat dissipation holes 340 is provided at each guide 320, they may be arranged in a longitudinal direction of the guide 320.

When the power supply unit 210 is provided at the base 200, the heat dissipation holes 340 allow heat generated from the power supply unit 210 to be outwardly dissipated after flowing through the base 200 and stand 300. Accordingly, it is possible to prevent the inner temperature of the base 200 from increasing to a high temperature. It is also possible to prevent heat from the power supply unit 210 provided at the base 200 from being transferred to the display body 100.

Additionally, the plural heat dissipation holes 340 may also be provided at wall portions of the stand 300, in particular, at a rear wall portion and/or a front wall portion.

Since the stand 300 is opened at a top thereof, heat generated from the base 200 and not dissipated through the heat dissipation fins 330 is completely dissipated through the top of the stand 300.

As described above, since the stand 300 includes the chamber 310, it is possible to prevent outward exposure of the electric wires extending from the display body 100, the electric wires extending from the base 200 and/or the electric wires connecting the display body 100 and base 200. Accordingly, it is possible to provide an excellent appearance to the display device 1000 and an excellent appearance to the space where the display device 1000 is installed. Also, since the stand 300 includes the heat dissipation fins 330 and/or the heat dissipation holes 340, it is possible to easily outwardly dissipate heat generated within the base 200. Accordingly, it is possible to prevent electric elements installed in the base 200 from being damaged due to heat generated within the base 200. Thus, an increase in the lifespan of the display device 1000 is achieved.

Although the stand 300 has been described as including the arc portion and the flat portion 350 or having a cylindrical shape, it may also be constituted by a hollow member having a polygonal cross-section.

Figure 11:
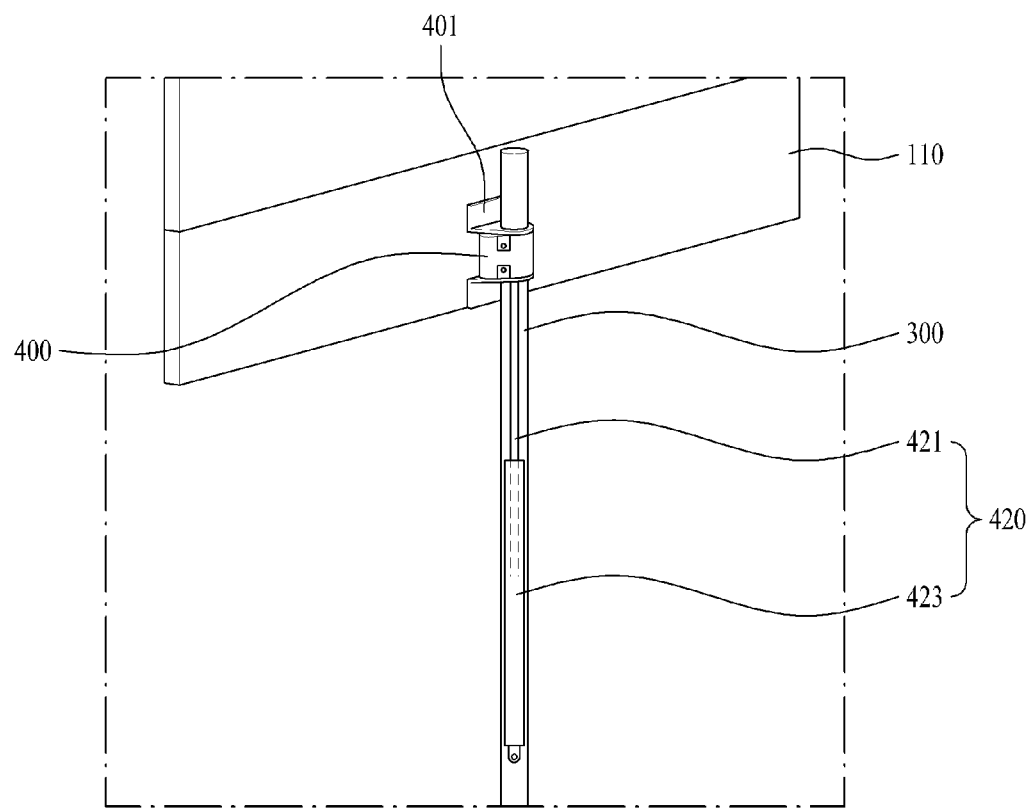
FIG. 11 is a rear perspective view schematically illustrating a connecting assembly according to an embodiment of the present invention.
Figure 12:
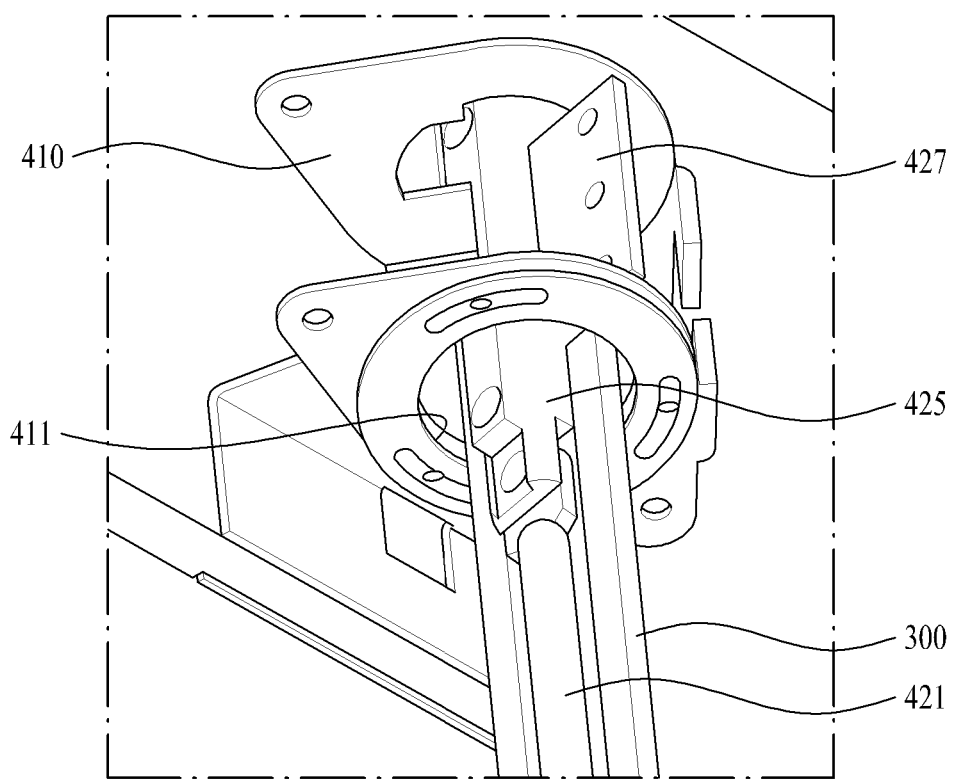
FIG. 12 is an enlarged view schematically illustrating a portion of the connecting assembly according to the embodiment of FIG. 11.

FIG. 11 is a rear perspective view schematically illustrating a connecting assembly according to an embodiment of the present invention, namely, the connecting assembly 400. FIG. 12 is an enlarged view schematically illustrating a portion of the connecting assembly 400 according to the embodiment of FIG. 11.

As shown in FIGS. 11 and 12, the connecting assembly 400 according to the illustrated embodiment includes a bracket 410 fixed to the display body 100 by a fixing plate 401, and a gas spring 420 connected to the bracket 410, to adjust vertical movement of the bracket 410 and display body 100.

The bracket 410 includes two fixing portions to be fixed to the rear surface of the display body 100 (for example, vertically arranged). The bracket 410 also includes an opening 411, through which the stand 300 extends. A support plate 427 is hingably mounted to the bracket 410 between the two fixing portions. The support plate 427 is connected to the gas spring 420.

The gas spring 420 is a lifter, which adjusts vertical movement of the display body 100, using gas pressure. The gas spring 420 includes a cylinder 423, in which gas is contained, a piston rod 421, which moves vertically in a telescopic manner within the cylinder 423, and a load transmitter 425 connected to an upper end of the piston rod 421, to be movable together with the bracket 410. The gas spring 420 also includes at least one support plate 427 provided at a lateral surface of the load transmitter 425 while being interposed between the fixing portions of the bracket 410.

The cylinder 423 and piston rod 421 are received in the interior of the stand 300 (namely, the chamber 310).

In this case, it is preferable that the stand 300 be the stand 300 according to the second embodiment of the present invention. That is, the stand 300 preferably has a cylindrical shape, to secure a space for receiving the cylinder and piston rod. Also, the stand 300 preferably includes a guide rail for guiding vertical movement of the support plate 427, which is slidably engaged with the guide rail.

When the display body 100 moves upwards, the gas spring 420 sucks gas (for example, air or compressed air) into the cylinder 423, to maintain the display body 100 in a raised state. When the display body 100 moves downwards, the gas spring 420 discharges the gas from the cylinder, to maintain the display body 100 in a lowered state. Meanwhile, the bracket 410 mounted to the display body 100 is rotatable with respect to the support plate 427 and, as such, the display body 100 is swivelable.

Figure 13:
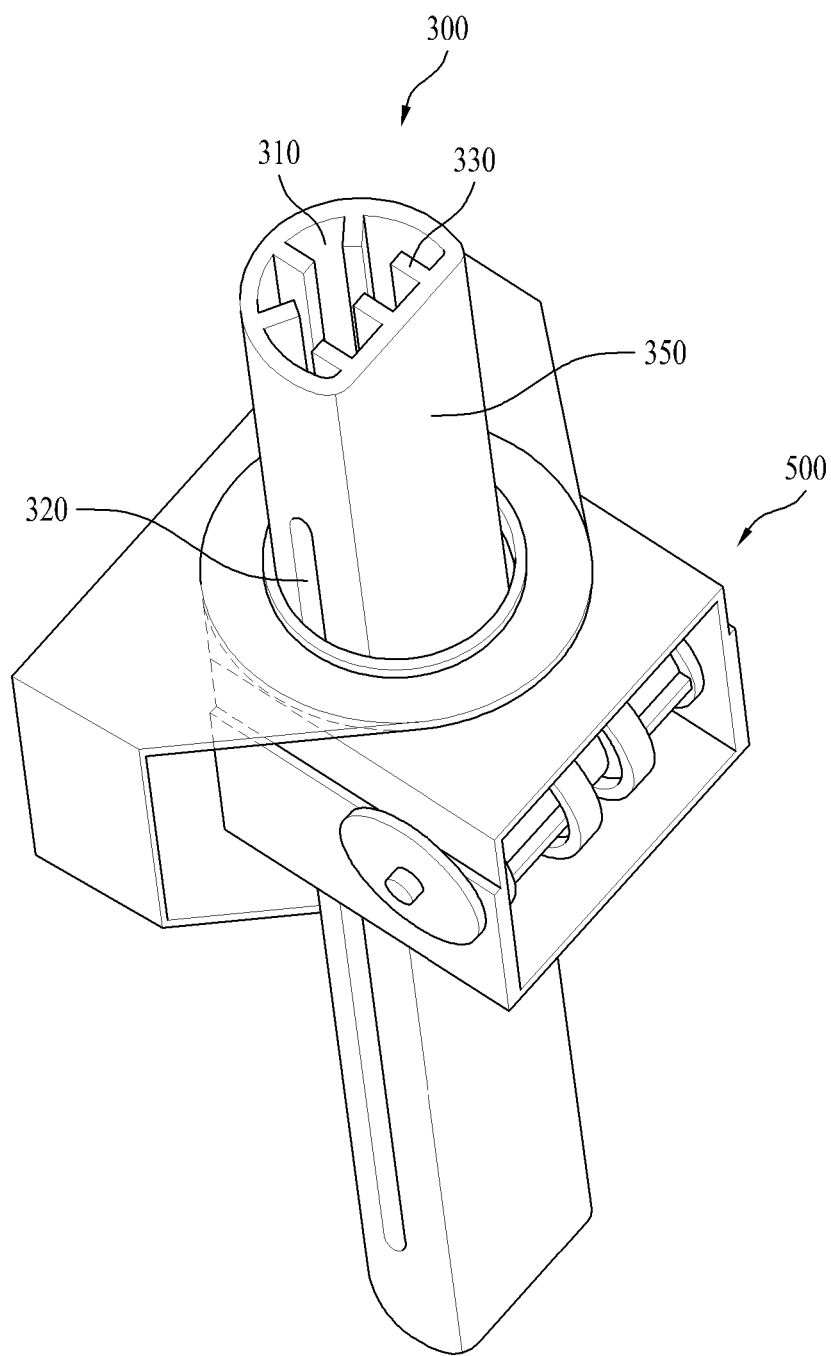
FIG. 13 is a rear perspective view schematically illustrating a connecting assembly according to another embodiment of the present invention.
Figure 14:
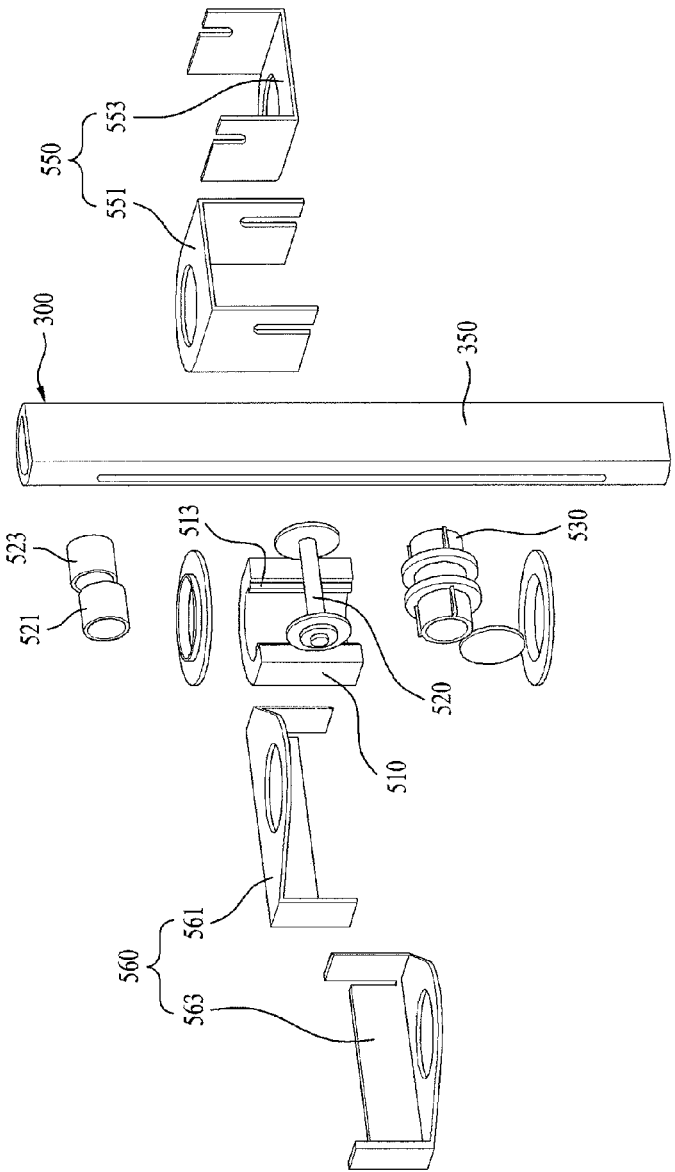
FIG. 14 is an exploded perspective view schematically illustrating the connecting assembly according to the embodiment of FIG. 13.
Figure 15:
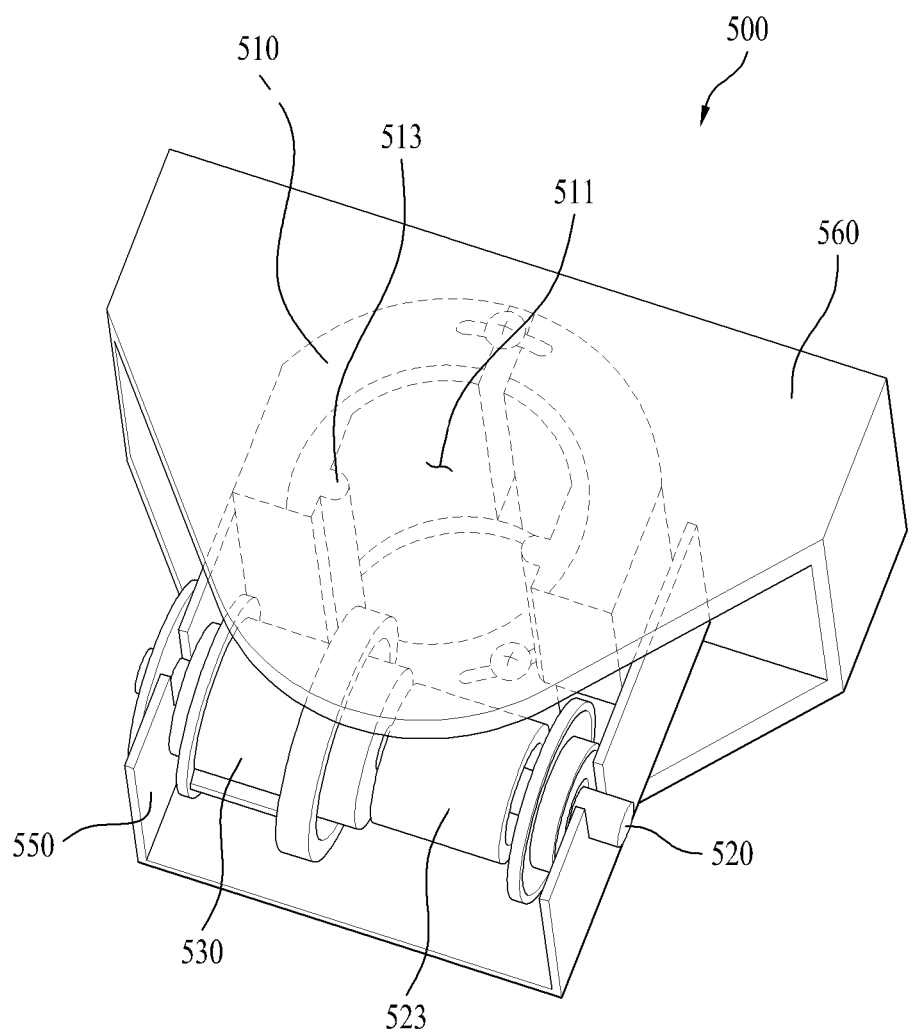
FIG. 15 is an enlarged view schematically illustrating a portion of the connecting assembly according to the embodiment of FIG. 13.

FIG. 13 is a rear perspective view schematically illustrating a connecting assembly according to another embodiment of the present invention, namely, the connecting assembly 500. FIG. 14 is an exploded perspective view schematically illustrating the connecting assembly 500 according to the embodiment of FIG. 13. FIG. 15 is an enlarged view schematically illustrating a portion of the connecting assembly 500 according to the embodiment of FIG. 13.

As shown in FIGS. 13 to 15, the connecting assembly 500 according to the illustrated embodiment includes a bracket 560 fixed to the display body 100, and a winding spring unit connected to the bracket 560, to adjust vertical movement of the bracket 410 and display body 100.

The bracket 560 includes an upper bracket 561 and a lower bracket 563. The bracket 560 is fixed to the rear surface of the display body 100, and defines a space, through which the stand 300 extends. The bracket 560 encloses the winding spring unit.

The winding spring unit includes a front slider 510 provided with an opening 511, to be fitted around the stand 300, while being provided with guide protrusions 513 fitted in respective guides 320 of the stand 300, a rear sliding wheel 530, which moves vertically while applying frictional force to the stand 300, and two winding springs 521 and 523 provided in the sliding wheel 530 while being wound in opposite winding directions. The winding spring unit also includes a slider frame 550 for connecting the rear sliding wheel 530 and front slider 510 while being rotatable with respect to the bracket 560. The rear sliding wheel 530 and two winding springs 521 and 523 are fixed to the slider frame 550 by a fixing pin 520.

In particular, inner free ends of the winding springs 521 and 523 are fixed to the fixing pin 520, whereas outer free ends of the winding springs 521 and 523 are fixed to the rear sliding wheel 530. Accordingly, the winding springs 521 and 523 are wound or unwound in accordance with rotation of the rear sliding wheel 530.

In this case, it is preferable that the stand 300 be the stand 300 according to the first embodiment of the present invention. The flat portion 350 of the stand 300 is pressed by the sliding wheel 530, thereby generating frictional force together with the sliding wheel 530, to cause the connecting assembly 500 to be maintained in a fixed state.

Under the condition that no external force is applied, the connecting assembly 500 is maintained at a fixed position by the frictional force or co-pressing force between the sliding wheel 530 and the flat portion 350 of the stand 300. However, when the connecting assembly 500 moves upwards or downwards with respect to the stand 300, one of the two winding springs 521 and 523, for example, the winding spring 521, is further wound from a previous state, thereby transmitting elastic resilience in an unwinding direction to the sliding wheel 530, whereas the other one of the two winding springs 521 and 523, namely, the winding spring 523, is further unwound from a previous state, thereby transmitting elastic resilience in a winding direction to the sliding wheel 530. As a result, the elastic resilience in the unwinding direction and the elastic resilience in the winding direction are statically and dynamically balanced, thereby preventing the sliding wheel 530 from rotating. Thus, the connecting assembly 500 is maintained at a raised or lowered position.

The bracket 560 encloses the slider frame 550 while being swivelable with respect to the slider frame 550.

As apparent from the above description, in accordance with the present invention, it is possible to accommodate wirings connected to the display body within the stand, thereby providing an excellent appearance to the display device.

Also, in accordance with the present invention, heat from the interior of the display device is outwardly dissipated, thereby preventing various electronic elements installed in the display device from being damaged due to heat. Accordingly, the lifespan of the display device can be increased.

In accordance with the present invention, the power supply unit can be mounted in the base. Accordingly, the thickness of the display body can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
   a display body comprising a display module;
   a stand for supporting the display body;
   a connecting assembly for mounting the display body to the stand;
   a base connected to a bottom portion of the stand and to support the stand against an installation surface on which the stand is installed;
   a chamber for receiving electric wires electrically connected to the display module; and
   a plurality of heat dissipation fins formed at an inner surface of the stand, to extend inwardly of the chamber.

2. The display device according to claim 1, wherein the stand is further provided with guides formed at opposite lateral wall portions of the stand, to guide the connecting assembly when the display body moves vertically with respect to the stand.

3. The display device according to claim 2, wherein each of the guides extends through the stand in a thickness direction of the stand.

4. The display device according to claim 2, wherein each of the guides comprises an elongated groove formed at the stand to extend to a predetermined depth in a thickness direction of the stand, and at least one heat dissipation hole extending through the elongated groove in the thickness direction of the stand.

5. The display device according to claim 1, wherein the stand is further provided with a plurality of heat dissipation holes formed through a rear wall portion of the stand in a thickness direction of the stand.

6. The display device according to claim 1, wherein the stand comprises an arc portion and a flat portion.

7. The display device according to claim 1, wherein the connecting assembly comprises a winding spring unit for adjusting a vertical movement of the display body by frictional force of the stand and complementary resiliances of a plurality of winding springs.

8. The display device according to claim 7, wherein the connecting assembly comprises a bracket fixedly mounted to the display body, a front slider provided with guide protrusions fitted in guides formed at the stand, a rear sliding wheel, which moves vertically while applying frictional force to the stand, two winding springs of the plurality of winding springs provided in the sliding wheel while being wound in opposite winding directions, and a slider frame for connecting the rear sliding wheel and the front slider while being rotatable with respect to the bracket.

9. The display device according to claim 1, wherein the stand comprises a cylindrical portion.

10. The display device according to claim 1, wherein the connecting assembly comprises a gas spring unit for adjusting a vertical movement of the display body by a gas pressure, and the gas spring unit comprises a cylinder, in which a gas is contained, and a piston rod, which moves vertically in a telescopic manner in the cylinder.

11. The display device according to claim 10, wherein the connecting assembly further comprises a bracket fixedly mounted to the display body, a load transmitter connected to an upper end of the piston rod such that the load transmitter is vertically movable together with the bracket, and at least one support plate provided at a lateral surface of the load transmitter, to be interposed between fixing portions of the bracket.

12. The display device according to claim 1, further comprising:
a support die coupled to a bottom portion of the base,
wherein the support die comprises a heat transfer boss for transferring, to a surface of the support die, heat generated from a heat source, which comprises the power supply unit disposed within the base.

13. The display device according to claim 1, wherein the connecting assembly enables the display body to be swivelable and vertically movable with respect to the stand.

14. The display device according to claim 1, further comprising:
a power supply unit for supplying electric power to the display module,
wherein the power supply unit is disposed within the base, and is electrically connected to the display module via one of the electric wires extending through the stand.

15. A display device comprising:
a display body comprising a display module;
a stand for supporting the display body;
a connecting assembly for mounting the display body to the stand;
a base connected to a bottom portion of the stand and to support the stand against an installation surface on which the stand is installed;
a chamber for receiving electric wires electrically connected to the display module; and
guides formed at opposite lateral wall portion of the stand, to guide the connecting assembly when the display body moves vertically with respect to the stand,
wherein each of the guides comprises an elongated groove formed at the stand to extend to a predetermined depth in a thickness direction of the stand, and at least one heat dissipation hole extending through the elongated groove in the thickness direction of the stand.

16. The display device according to claim 15, wherein the connecting assembly enables the display body to be swivelable and vertically movable with respect to the stand.

17. The display device according to claim 15, further comprising:
a power supply unit for supplying electric power to the display module,
wherein the power supply unit is disposed within the base, and is electrically connected to the display module via one of the electric wires extending through the stand.

18. A display device comprising:
a display body comprising a display module;
a stand for supporting the display body;
a connecting assembly for mounting the display body to the stand;
a base connected to a bottom portion of the stand and to support the stand against an installation surface on which the stand is installed;
a chamber for receiving electric wires electrically connected to the display module; and
guides formed at opposite lateral wall portion of the stand, to guide the connecting assembly when the display body moves vertically with respect to the stand,
wherein each of the guides comprises a slot formed at the stand to extend through the stand in a thickness direction of the stand.

19. The display device according to claim 18, wherein the connecting assembly enables the display body to be swivelable and vertically movable with respect to the stand.

20. The display device according to claim 18, further comprising:
a power supply unit for supplying electric power to the display module,
wherein the power supply unit is disposed within the base, and is electrically connected to the display module via one of the electric wires extending through the stand.

* * * * *